United States Patent [19]

Arikawa

[11] 4,435,768
[45] Mar. 6, 1984

[54] SKID CONTROL SYSTEM
[75] Inventor: Tetsuro Arikawa, Kanagawa, Japan
[73] Assignee: Nippon Air Brake Co., Ltd., Kobe, Japan
[21] Appl. No.: 231,095
[22] Filed: Feb. 3, 1981
[51] Int. Cl.$^3$ ............................................. B60T 8/08
[52] U.S. Cl. ...................................... 364/426; 303/105
[58] Field of Search ............................... 303/105–111, 303/119; 364/426

[56] References Cited

U.S. PATENT DOCUMENTS

| | | | |
|---|---|---|---|
| 3,467,444 | 9/1969 | Leiber | 303/105 |
| 3,540,779 | 11/1970 | Marouby | 303/105 |
| 3,550,966 | 12/1970 | Leiber | 303/21 |
| 4,166,406 | 9/1979 | Maughmer | 89/1.815 |
| 4,225,195 | 9/1980 | Weise et al. | 303/105 |

*Primary Examiner*—J. V. Truhe
*Assistant Examiner*—Saul M. Bergmann
*Attorney, Agent, or Firm*—McDougall, Hersh & Scott

[57] ABSTRACT

A skid control system for a vehicle having at least one wheel and a brake for the wheel includes a wheel speed detector for providing an output signal representative of the speed of the wheel; differentiater for differentiating the output signal of the wheel speed detector and providing an output signal representative of acceleration or deceleration of the wheel; a deceleration signal generator connected to the differentiater, the deceleration signal generator generating a deceleration signal when the output signal of the differentiater exceeds a predetermined threshold deceleration; an acceleration signal generator connected to the differentiater, the acceleration signal generator generating an acceleration signal when the output signal of the differentiater exceeds a predetermined threshold acceleration; a brake relieving circuit for decreasing the brake pressure to the brake for the wheel in response to the deceleration signal of the deceleration signal generator; a first brake control circuit for maintaining the brake pressure to the brake for the wheel constant, or gradually increasing the brake pressure to the brake for the wheel, in response to the acceleration signal of the acceleration signal generator; and a second brake control circuit for rapidly increasing the brake pressure to the brake for the wheel for a predetermined time in accordance with the slope of the output signal of the differentiator within the time when the acceleration signal generator generates the acceleration signal.

11 Claims, 4 Drawing Figures

SKID CONTROL SYSTEM

BACKGROUND OF THE INVENTION

1. Field of the Invention

This invention relates to a skid control system for a vehicle having at least one wheel and a brake for the wheel, and more particularly to a skid control system in which, when the deceleration of the wheel exceeds the predetermined threshold deceleration, the brake pressure to the brake for the wheel is decreased with time, and when the acceleration of the wheel exceeds the predetermined threshold acceleration, the brake pressure to the wheel is maintained constant, or gradually increased with time.

2. Description of the Prior Art

A skid control system is used for a vehicle having at least one wheel and a brake for the wheel, by which skid control operation for the wheel is performed to avoid a locked wheel condition and obtain good braking performance on any road. In a conventional skid control system, rotational conditions of the wheel such as deceleration, slip and acceleration are measured to skid control the wheel. When the deceleration or slip of the wheel exceeds a predetermined threshold deceleration or a predetermined threshold slip, the brake pressure to the brake is decreased, and when the acceleration of the wheel exceeds a predetermined threshold acceleration, the brake pressure to the wheel is maintained constant, namely at the decreased brake pressure, or gradually increased.

A wheel speed sensor is associated with the wheel for detecting the rotational speed of the wheel. The acceleration, deceleration and slip of the wheel are measured on the basis of the detecting output of the wheel speed sensor. Known speed sensors include a rotating member fixed mounted in relation to the wheel and a stationary member affixed to the vehicle chassis. Wheel rotational velocity is determined by the relative rotational motion between these two members.

When vehicle braking forces are applied abruptly, a vehicle or, in particular, a motorcycle will rock forwardly about its center of gravity thereby momentarily reducing the relative rotational movement between the vehicle and its wheels. This results in an instantaneous and erroneous low wheel speed output from the wheel speed detector. Accordingly, the magnitude of the change of wheel speed detected by the wheel speed sensor is larger than that of the change of the actual wheel speed thereby decreasing the braking pressure more than required and unnecessarily lengthening the vehicle braking distance.

SUMMARY OF THE INVENTION

An object of this invention is to provide a skid control system which overcomes the above defects of the conventional skid control system.

Another object of this invention is to provide a skid control system in which the skid control operation for the wheel can be optimized. In particular, the present invention facilitates the rapid return or increase in brake pressure to compensate for the erroneous reductions in braking pressure caused by instaneously low wheel speed detector outputs.

In accordance with an aspect of this invention, a skid control system for a vehicle haivng at least one wheel and a brake for the wheel includes (A) wheel speed detecting means for providing an output signal representative of the speed of the wheel; (B) differentiating means for differentiating the output signal of the wheel speed detecting means and providing an output signal representative of acceleration or deceleration of the wheel; (C) a deceleration signal generator connected to the differentiating means, the deceleration signal generator generating a deceleration signal when the output signal of the differentiating means exceeds a predetermined threshold deceleration; (D) an acceleration signal generator connected to the differentiating means, the acceleration signal generator generating an acceleration signal when the output signal of the differentiating means exceeds a predetermined threshold acceleration; (E) brake relieving means for decreasing the brake pressure to the brake for the wheel in response to the deceleration signal of the deceleration signal generator; (F) first brake control means for maintaining the brake pressure to the brake for the wheel constant, or gradually increasing the brake pressure to the brake for the wheel, in response to the acceleration signal of the acceleration signal generator; and (G) second brake control means for rapidly increasing the brake pressure to the brake for the wheel, for a predetermined time in accordance with the slope of the output signal of the differentiating means within the time when the acceleration signal generator generates the acceleration signal.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Next, a skid control system according to one embodiment of this invention will be described with reference to the drawings.

Figure 1:
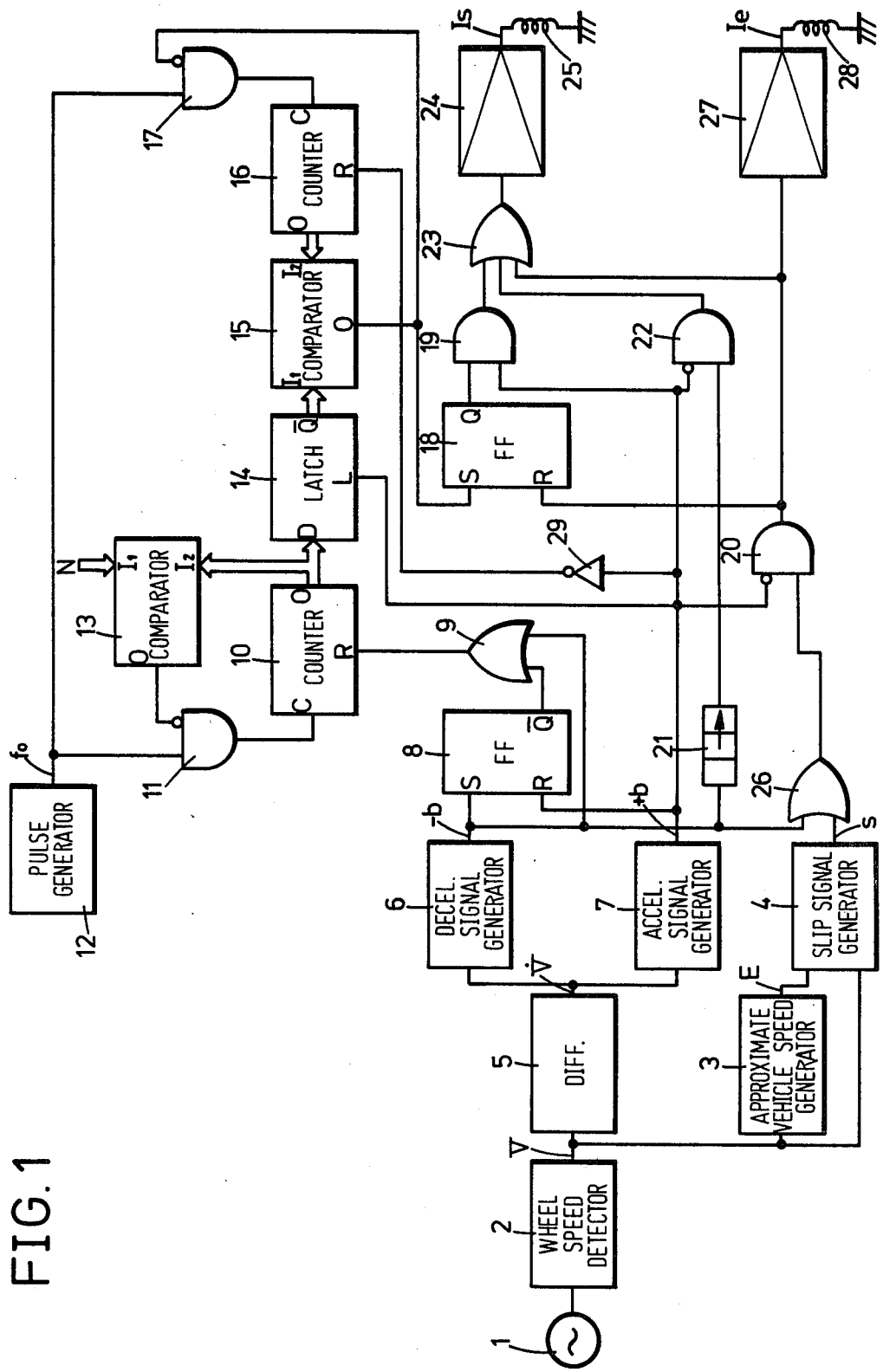
FIG. 1 is a block diagram of a skid control system according to one embodiment of this invention.

In FIG. 1, a wheel speed sensor 1 is associated with one wheel of the vehicle, and it generates a pulse signal having a frequency proportional to the rotational speed of the wheel. The pulse signal of the wheel speed sensor 1 is supplied to a wheel speed generating circuit or wheel speed detector 2 to be converted to a wheel speed signal V having analog or digital value proportional to the rotational speed of the wheel.

The output signal V of the wheel speed signal detector 2 is supplied to an approximate body (vehicle) speed generator 3, a slip signal generator 4 and a differentiator 5. Since the actual speed of the vehicle cannot be conveniently measured directly, the vehicle speed is simulated by the approximate vehicle speed generator 3. The simulated vehicle speed signal E (shown in FIG. 3A) from the approximate vehicle speed generator 3 is supplied to the slip signal generator 4 to determine the slip of the wheel. In the slip signal generator 4, the simulated vehicle speed signal or approximate vehicle speed signal E is compared with the wheel speed signal V. Generally, a slip S is given by the following formula:

When $$S = 1 - \frac{\text{wheel speed}}{\text{vehicle speed}}$$

When $$\left(1 - \frac{V}{E}\right)$$

is larger than a predetermined threshold slip (for example 0.20), the slip signal generator 4 generates a slip signal S, namely the output of the slip signal generator 4 becomes higher as "1". And when $$\left(1 - \frac{V}{E}\right)$$

is smaller than the predetermined threshold slip, the output of the slip signal generator 4 becomes lower as "0".

The wheel speed signal V of the wheel speed signal generator 2 is differentiated with respect to time in the differentiator 5. A signal $\dot{V}$ proportional to the acceleration or deceleration of the wheel is generated from the differentiator 5, and it is supplied to a deceleration signal generator 6 and an acceleration signal generator 7. In the deceleration signal generator 6, the output signal $\dot{V}$ of the differentiator 5 is compared with a predetermined threshold deceleration which is, for example, equal to $-1.5$ g. When the absolute value of the signal $\dot{V}$ is larger than that of the predetermined threshold deceleration, the deceleration signal generator 6 generates a deceleration signal $-b$, namely the output of the deceleration signal generator 6 becomes higher as "1". And when the absolute value of the signal $\dot{V}$ is smaller than that of the predetermined threshold deceleration, the output of the deceleration signal generator 6 becomes lower as "0".

In the acceleration signal generator 7, the output signal $\dot{V}$ of the differentiator 5 is compared with a predetermined threshold acceleration which is, for example, equal to 0.5 g. When the signal V is larger than the predetermined threshold acceleration, the acceleration signal generator 7 generates an acceleration signal $+b$, namely the output of the acceleration signal generator 7 becomes higher as "1". And when the signal $\dot{V}$ is smaller than the predetermined threshold acceleration, the output of the acceleration signal generator 7 becomes lower as "0".

An output terminal of the deceleration signal generator 6 is connected to a set terminal S of a flip flop 8, an input terminal of an OR gate 9, an OFF-delay timer 21, and an input terminal of another OR gate 26. Another input terminal of the OR gate 26 is connected to an output terminal of the slip signal generator 4.

The output of the OFF-delay timer 21 becomes higher as "1" at the same time when the deceleration signal $-b$ is generated from the deceleration signal generator 6. It is maintained at the higher level for a predetermined time, for example, 0.1 second, after the deceleration signal $-b$ dissipates, namely the output of the deceleration signal generator 6 becomes lower as "0". Then, it becomes lower as "0".

An inversion output terminal $\overline{Q}$ of the flip flop 8 is connected to another input terminal of the OR gate 9. A reset terminal R of the flip flop 8 is connected to an output terminal of the acceleration signal generator 7. An output terminal of the OR gate 9 is connected to a reset terminal R of a first UP-counter 10. A clock terminal C of the counter 10 is connected to an output terminal of an AND gate 11. An input terminal of the AND gate 11 is connected to a pulse generator 12 which generates clock pulses having a predetermined frequency fo. Output terminals O of the counter 10 are connected to input terminals $I_2$ of a comparator 13. A predetermined digital value N is set at other input terminals $I_1$ of the comparator 13. An output terminal O of the comparator 13 is connected to a negation input termimal of the AND gate 11.

The output terminals O of the first UP-counter 10 are further connected to input terminals D of a latch circuit 14. A latch terminal L of the latch circuit 14 is connected to the output terminal of the acceleration signal generator 7. The latch circuit 14 memorizes a counted value of the first UP-counter 10 at the moment that the output of the acceleration signal generator 7 becomes higher as "1". An inversion output $\overline{Q}$ having a complementary value to the counted value of the first UP-counter 10 is obtained from terminals $\overline{Q}$ of the latch circuit 14, and it is supplied to input terminals $I_1$ of a second comparator 15. Other input terminals $I_2$ of the second comparator 15 are connected to output terminals O of a second UP-counter 16.

A clock terminal C of the second UP-counter 16 is connected to an output terminal of an AND gate 17. An input terminal of the AND gate 17 is connected to the pulse generator 12. A reset terminal R of the second Up-counter 16 is connected to an output terminal of an invertor 29. An input terminal of the invertor 29 is connected to the output terminal of the acceleration signal generator 7. An output terminal O of the second comparator 15 is connected to a set terminal S of a flip-flop 18, and a negation input terminal of the AND gate 17. When the output of the latch circuit 14 becomes equal to a counted value of the second up-counter 16, the output of the second comparator 15 becomes higher as "1" to set the flip flop 18 and to close the AND gate 17.

An output terminal of the OR gate 26 is connected through an AND gate 20 to a reset terminal R of the flip flop 18. A negation input terminal of the AND gate 20 is connected to the output terminal of the acceleration signal generator 7. An output terminal Q of the flip flop 18 is connected to one input terminal of an AND gate 19. Another input terminal of the AND gate 19 is connected to the output terminal of the acceleration signal generator 7 which is further connected to a negation input terminal of an AND gate 22. Another input terminal of the AND gate 22 is connected to the output terminal of the OFF-delay timer 21.

Figure 2:
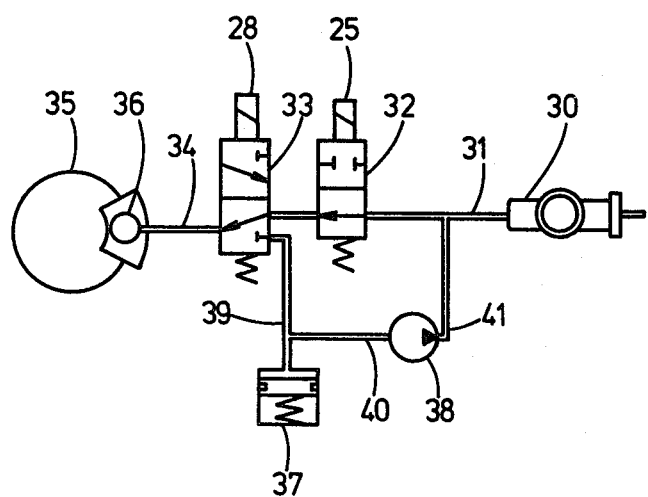
FIG. 2 is a schematic view of a brake apparatus incorporated with the skid control system of FIG. 1.

An output terminal of the AND gate 19 is connected to a first input terminal of an OR gate 23. An output terminal of the AND gate 22 is connected to a second input terminal of the OR gate 23. The output terminal of the AND gate 20 is connected to a third input terminal of the OR gate 23. An output terminal of the OR gate 23 is connected through an amplifier 24 to a solenoid portion 25 of an inlet valve 32 which is shown in FIG. 2. The output terminal of the AND gate 20 is further connected through an amplifier 27 to a solenoid portion 28 of an outlet valve 33 which is shown in FIG. 2. When the output of the OR gate 23 or the output of the AND gate 20 becomes higher as "1", a current $I_s$ is supplied from the amplifier 24 into the solenoid portion 25 of the inlet valve 32 to energize the latter. When the output of the AND gate 20 becomes higher as "1", a current Ie is supplied from the amplifier 27 into the solenoid portion 28 of the outlet valve 33 to energize the latter, and further the current $I_s$ is supplied from the amplifier 24 into the solenoid portion 25 of the inlet valve 32 to energize the latter.

The flip flop 8, the OR gate 9, the first UP-counter 10 and the latch circuit 14 constitute a circuit to measure a decrease slope of the wheel deceleration V or an increase slope of the wheel acceleration V. in the time interval extending from the time when the deceleration of the wheel has reached the predetermined threshold deceleration after exceeding the maximum deceleration, to the time when the acceleration of the wheel has reached the predetermined threshold acceleration. The flip flop 8 is set with the deceleration signal $-b$ of the deceleration signal generator 6. The $\overline{Q}$ output of the flip flop 8 becomes lower as "0". Then, when the deceleration signal $-b$, dissipates, the output of the OR gate 9 becomes lower as "0", to release the reset of the first UP-counter 10. The first UP-counter 10 starts to count the clock pulses fo from the pulse generator 12. The counted value of the UP-counter 10 is transmitted to the latch circuit 14. At the moment that the acceleration signal $+b$ is generated from the acceleration signal generator 7, the counter value of the first UP-counter 10 is memorized by the latch circuit 14. The memorized counted value is proportional to the time interval extending from the time when the deceleration of the wheel has reached the predetermined threshold deceleration after exceeding the maximum deceleration, to the time when the acceleration of the wheel has reached the predetermined threshold acceleration. Accordingly, the fact that the memorized counted value is small, means that the decrease slope of the wheel deceleration or the increase slope of the wheel acceleration is large. And the fact that the memorized counted value is large, means that the decrease slope of the wheel deceleration or the increase slope of the wheel acceleration is small.

In the comparator 13, the counted value of the first UP-counter 10 is compared with the predetermined value N. When the counted value of the first UP counter 10 reaches the predetermined value N, the output of the comparator 13 becomes higher as "1 " to close the AND gate 11. The clock pulse fo from the pulse generator 12 is intercepted from the first UP-counter 10. Accordingly, the latter is prevented from counting more than the predetermined value N.

The second Up-counter 16, the second comparator 15, the flip flop 18 and the AND gate 19 constitute a circuit to set a predetermined time to rapidly rise the brake pressure to the wheel immediately after the acceleration of the wheel reaches the predetermined threshold acceleration. At the moment that the acceleration signal $+b$ is generated from the acceleration signal generator 7, or the output of the invertor 29 becomes lower as "0", the second Up-counter 16 starts to count the clock pulse fo from the pulse generator 12. The counted value of the counter 16 is transmitted to the second comparator 15. The output $\overline{Q}$ of the latch circuit 14, which is complementary to the memorized digital value, is compared with the counted value of the second UP-counter 16. When the counted value of the second UP-counter 16 becomes equal to the ouput $\overline{Q}$ of the latch circuit 14, the output of the second comparator 16 becomes higher as "1" to set the flip flop 18. The output of the flip flop 18 becomes higher as "1". Since the accelerating signal $+b$ is still applied to the other input terminal of the AND gate 19, the output of the AND gate 19 becomes higher as "1", when the flip flop 18 is set. At the same time, the AND gate 17 is closed with the output of the second comparator 16 to intercept the clock pulse generated from the pulse generator 12. The second Up-counter 16 is prevented from counting more.

Thus, the predetermined time to rapidly rise the brake pressure to the wheel is equal to the time interval extending from the time when the second Up-counter 16 starts to count the clock pulse fo from the pulse generator 12 with the occurrence of the acceleration signal $+b$, to the time when the counted value of the second Up-counter 16 reaches the inversion or complement output $\overline{Q}$ of the latch circuit 14. Accordingly, when the counted value of the first Up-counter 10 memorized by the latch circuit 14 is large, the predetermined time to rapidly rise the brake pressure to the wheel is short. And when the counted value of the first Up-counter 10 memorized by the latch circuit 14 is small, the predetermined time to rapidly rise the brake pressure to the wheel is long.

Next, there will be described a vehicle braking system incorporated with the skid control system of FIG. 1 with reference to FIG. 2.

Referring to FIG. 2, a master cylinder 30 is connected through a conduit 31, the inlet valve 32, the outlet valve 33, and a conduit 34 to a brake cylinder 36 of a disc brake 35 which is mounted on the wheel.

Although schematically shown in FIG. 2, the inlet valve 32 and the outlet valve 33 have well-known constructions, and they are called also "cut-off valve" and "discharge valve", respectively. A discharge opening of the outlet valve 33 is connected through a conduit 39 to a reservoir 37 which is connected through a conduit 40 to an inlet of a pump 38. An outlet of the pump 38 is connected through a conduit 41 to the conduit 31.

When the solenoid portions 25 and 28 of the inlet and outlet valves 32 and 33 are not energized, the master cylinder 30 communicates with the brake cylinder 36 of the disc brake 35 so that the brake pressure to the wheel is increased. When both of the solenoid portions 25 and 28 of the inlet and outlet valves 32 and 33 are energized, the communication between the master cylinder 30 and the brake cylinder 36 is cut off, and a discharge opening of the outlet valve 33 is connected to the brake cylinder 36 to discharge brake fluid into the reservoir 37, so that the brake pressure to the wheel is lowered. The brake fluid is returned through the conduits 40 and 41 to the conduit 31 by the pump 38. And when only the solenoid portion 25 of the inlet valve 32 is energized, the communication between the master cylinder 30 and the brake cylinder 36 is cut off, and however, a supply opening of the outlet valve 33 remains connected with the brake cylinder 36, so that the brake pressure to the wheel is maintained constant.

Figure 3:
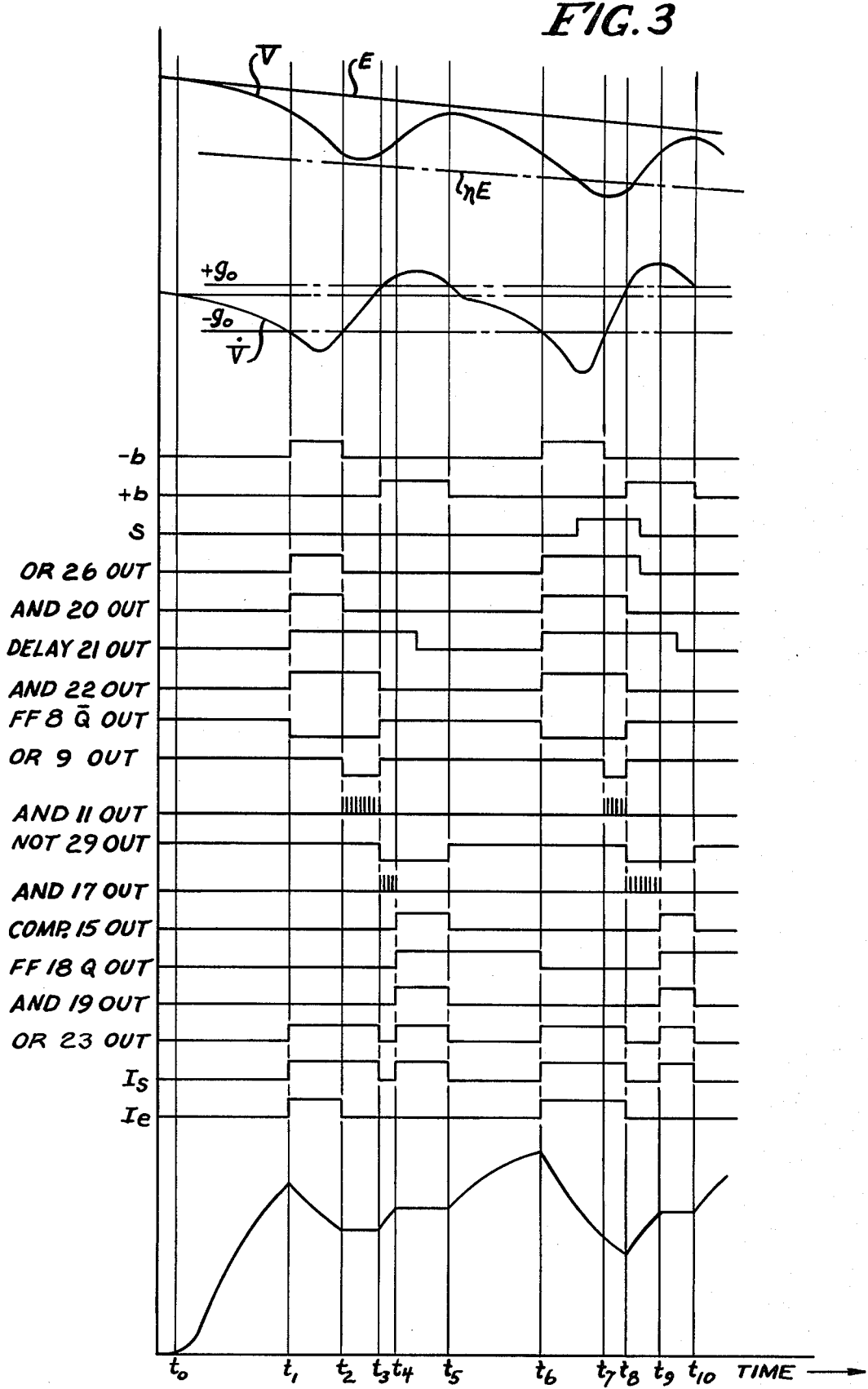
FIG. 3 is time charts for explaining operation of the skid control system of FIG. 1.
Figure 4:
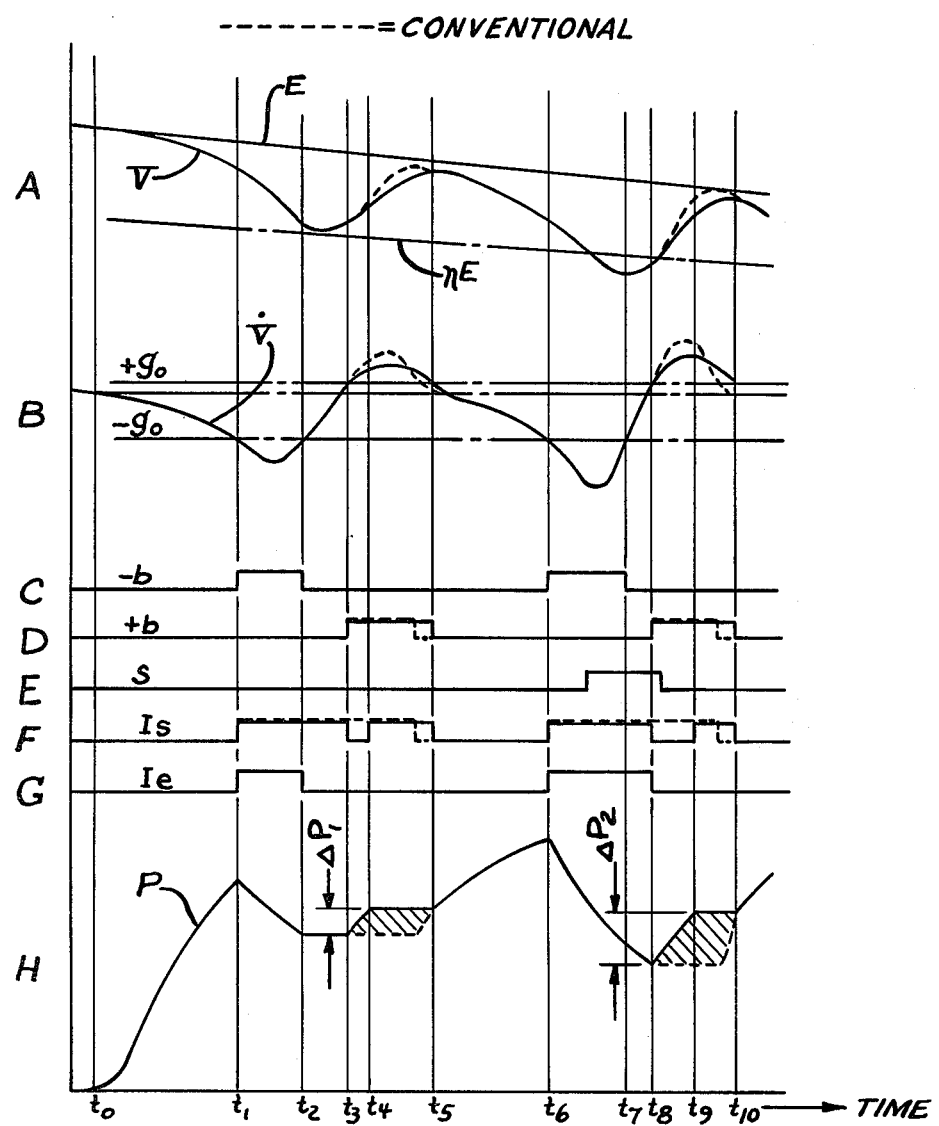

Next, there will be described operation of the above-described system with reference to FIG. 1 to FIG. 3.

The driver of the vehicle operates the master cylinder 30 at time to. Since both of the solenoid portions 25 and 28 of the inlet and outlet valves 32 and 33 are not still energized, the master cylinder 30 communicates through the inlet and outlet valves 32 and 33 with the brake cylinder 36. Accordingly, the brake pressure P to the wheel increases, as shown in FIG. 3H, with the operation of the master cylinder 30 to lower the wheel speed. The wheel speed signal V from the wheel speed signal detector 2 and the output $\dot{V}$ representing acceleration or deceleration from the differentiator 5 decrease with the rise of the brake pressure P, as shown in FIG. 3A and FIG. 3B. On the other hand, the approximate vehicle speed signal E from the approximate vehicle speed sigal generator 3 slowly lowers with time, as shown in FIG. 3A.

At time $t_1$, the deceleration of the wheel reaches the predetermined threshold deceleration, or the output $\dot{V}$ of the differentiator 5 reaches the threshold $-g_0$ as shown in FIG. 3B. The deceleration signal $-b$ is generated from the deceleration signal generator 6 as shown in FIG. 3C, and it is supplied through the OFF-delay timer 21 to the AND gate 22. The acceleration signal generator 7 connected to the negation input terminal of the AND gate 22 does not still generate the acceleration signal $+b$. Accordingly the output of the AND gate 22, and therefore the output of the OR gate 23 become higher as "1". The current $I_s$ is supplied from the amplifier 24 to the solenoid portion 25 of the inlet valve 32 to energize the latter. At the same time, the deceleration signal $-b$ is supplied to the OR gate 26. The output of the OR gate 26, and therefore the output of the AND gate 20 become higher as "1". Accordingly, the current $I_e$ is supplied from the amplifier 27 to the solenoid portion 28 of the outlet valve 33 to energize the latter. Thus the inlet valve 32 and the outlet valve 33 are concurrently actuated to cut off the communication between the master cylinder 30 and the brake cylinder 36. The brake fluid is discharged from the brake cylinder 36 into the reservoir 37. Thus, the brake pressure P of the brake cylinder 36 decreases with time, as shown in FIG. 3H.

On the other hand, the deceleration signal $-b$ is supplied to the set terminal S of the flip flop 8 to set the latter. The output $\overline{Q}$ of the flip flop 8 becomes lower as "0".

The deceleration of the wheel starts to reduce with the decrease of the brake pressure P. At time $t_2$, it becomes smaller than the threshold $-g_0$ after exceeding the maximum. The deceleration signal $-b$ dissipates. Accordingly, the output of the OR gate 26, and therefore the output of the AND gate 20 becomes lower as "0", and the solenoid portion 28 of the outlet valve 33 is deenergized. The outlet valve 33 takes the inoperative position. However, since the output of the OFF-delay timer 21 is maintained at the higher level due to the OFF-delay function, the inlet valve 32 remains energized. Accordingly, the brake pressure P is maintained constant, as shown in FIG. 3H.

At the same time when the deceleration signal $-b$ dissipates, the output of the OR gate 9 becomes lower as "0" to reliese the reset of the first Up-counter 10. It starts to count the clock pulses fo from the pulse generator 12.

Meanwhile, acceleration occurs in the wheel. At the time $t_3$, the acceleration of the wheel becomes higher than the predetermined acceleration threshold, or the output $\dot{V}$ of the differentiator 5 becomes higher than the threshold $+g_0$ as shown in FIG. 3B. The acceleration signal $+b$ is generated from the acceleration signal generator 7, and it is supplied to the negation input terminal of the AND gate 22. The output of the AND gate 22 becomes lower as "0". Since the flip flop 18 is not still set, and the deceleration signal $-b$ already dissipated, the signals to the first and third input terminals of the OR gate 23 are at the lower level. Accordingly, the output signal of the OR gate 23 becomes lower as "0" with the lower output of the AND gate 22.

The current $I_s$ stops to flow to the solenoid portion 25 of the inlet valve 32, as shown in FIG. 3F. Thus, the solenoid portion 25 is deenergized. The inlet valve 32 takes the inoperative position. Now, since both of the inlet and outlet valves 32 and 33 takes the inoperative positions as shown in FIG. 2, the master cylinder 30 communicates with the brake cylinder 36 to transmit the brake pressure of the master cylinder 30 to the brake cylinder 36. The brake pressure P of the brake cylinder 36 rapidly rises as shown in FIG. 3H.

On the other hand, the acceleration signal $+b$ is supplied to the latch terminal L of the latch circuit 14, and the input terminal of the invertor 29 whose output terminal is connected to the reset terminal R of the second Up-counter 16. The counted value of the first Up-counter 10 at the moment that the acceleration signal $+b$ is supplied to the latch terminal L of the latch circuit 14, is memorized by the latch circuit 14. Concurrently, the second Up-counter 16 starts to count the clock pulses fo from the pulse generator 12.

At the time $t_4$ when the counted value of the second Up-counter 16 reaches the complementary output Q to the memorized counted value of the latch circuit 14, the output signal of the comparator 15 becomes higher as "1" to set the flip flop 18. The output signal Q of the flip flop 18 becomes higher as "1", and it is supplied to the one input terminal of the AND gate 19. Since the acceleration signal $+b$ is still supplied to the other input terminal of the AND gate 19, the output signal of the AND gate 19 becomes higher as "1" with the set of the flip flop 18. Accordingly, the current $I_s$ starts to flow into the solenoid portion 25 of the inlet valve 32 to energize the latter. Thus, the brake pressure P to the wheel is maintained constant.

In this embodiment, as above described, the brake pressure P to the wheel is maintained constant from the time $t_4$ when the flip flop 18 is set with the output signal of the second comparator 15. However, the brake pressure P may be gradually increased from the time $t_4$. In that case, a pulse generator from which rectangular pulses having a predetermined frequency are generated, is arranged between the output terminal Q of the flip flop 18 and the one input terminal of the AND gate 19. The pulse generator is driven with the output of the flip flop 18. The solenoid portion 25 of the inlet valve 32 is discontinuously energized with the output pulses of the pulse generator so that the brake pressure P is stepwisely increased with time, or, in other words, it is gradually increased.

The wheel speed signal V approaches to the approximate vehicle speed signal E. At time $t_5$, the acceleration V of the wheel becomes smaller than the threshold $g_0$. The acceleration sigal $+b$ dissipates as shown in FIG. 3D. The output signal of the AND gate 19, and therefore the output signal of the OR gate 23 becomes lower as "0" with the dissipation of the acceleration signal $+b$. The delay time of the OFF-delay timer 21 for which the output thereof is at the higher level, lapses before the acceleration signal $+b$ dissipates. Accordingly, the solenoid portion 25 of the inlet valve 32 is deenergized with the dissipation of the acceleration signal $+b$ at the time $t_5$. The brake pressure P increases with time, as shown in FIG. 3H.

The deceleration of the wheel increases with the brake pressure P. At time $t_6$, it reaches the threshold $-g_0$. The deceleration signal $-b$ is generated from the deceleration signal generator 6. The output of the AND gate 20, and therefore the output of the OR gate 23 become higher as "1". The currents $I_s$ and $I_e$ are supplied to the solenoid portion 25 and 28 of the inlet and outlet valves 32 and 33, respectively, as shown in FIG. 3F and FIG. 3G. The brake pressure P of the brake cylinder 36 again decreases with time, from the time $t_6$ as shown in FIG. 3H.

The deceleration of the wheel decreases with the lowering of the brake pressure P after exceeding the maximum, as shown in FIG. 3B. At time $t_7$, it becomes smaller than the threshold —go. The deceleration signal —b dissipates. The first Up-counter 10, as above described, starts to count the clock pulses fo from the pulse generator 12. However, in this case, the ratio of the wheel speed signal V to the approximate vehicle speed signal E becomes smaller than the predetermined ratio $\kappa$, before the deceleration signal —b dissipates. The predetermined ratio $\kappa$ is equal to (1— the predetermined threshold slip), which is, for example, 0.80. Thus, the slip of the wheel becomes larger than the predetermined threshold slip before the time $t_7$. The slip signal S is generated from the slip signal generator 4 as shown in FIG. 3E, and it is supplied through the OR gate 26 to the AND gate 20. Accordingly, the output of the AND gate 20, and therefore the output of the OR gate 23 remain higher as "1", although the deceleration signal —b dissipates at the time $t_7$. The brake pressure P continues to decrease after the time $t_7$, as shown in FIG. 3H.

The deceleration of the wheel decreases with the lowering of the brake pressure P, after exceeding the maximum. At time $t_8$, the acceleration $\dot{V}$ of the wheel reaches the threshold +go. The acceleration signal +b is generated from the acceleration signal generator 7. The output of the AND gate 20, that of the AND gate 22 and that of the OR gate 23 become lower as "0". The solenoid portions 25 and 28 of the inlet and outlet valves 32 and 33 are deenergized to rapidly rise the brake pressure P of the brake cylinder 36. Concurrently, the counted value of the first Up-counter 10 at the moment is memorized by the latch circuit 14, and the second Up-counter 16 starts to count the clock pulses fo from the pulse generator 12.

The output signal of the second comparator 15 becomes higher as "1" at the time $t_9$ when the counter value of the second Up-counter 16 reaches the inversion output Q of the latch circuit 14. The flip flop 18 is set. The output of the flip flop 18 is supplied through the AND gate 19 to the OR gate 23. The solenoid portion 25 of the inlet vavle 32 is energized with the output signal of the OR gate 23. The solenoid portion 28 of the outlet valve 33 was deenergized at the time $t_8$ when the acceleration signal +b was generated from the acceleration signal generator 7. Accordingly, the brake pressure P is maintained constant from the time $t_9$.

The second decreasing speed of the deceleration of the wheel, or the interval extending from the time $t_7$ when the deceleration $\dot{V}$ of the wheel reaches secondarily the threshold deceleration —go after exceeding the maximum, to the time $t_8$ when the acceleration $\dot{V}$ of the wheel reaches secondarily the threshold acceleration +go, is higher or shorter than the first decreasing speed of the deceleration of the wheel, or the interval extending from the time $t_2$ when the deceleration $\dot{V}$ of the wheel reaches firstly the threshold deceleration —go after exceeding the maximum, to the time $t_3$ when the acceleration $\dot{V}$ of the wheel reaches firstly the threshold acceleration +go. Accordingly, the second time for rapidly increasing the brake pressure, or the interval extending from the time $t_8$ when the second counter 16 starts to count the clock pulses fo, to the time $t_9$ when the counted value of the second counter 16 reaches secondarily the complementary output of the latch circuit 14, is longer than the first time for rapidly increasing the brake pressure, or the interval extending from the time $t_3$ when the second counter 16 starts to count the clock pulses fo, to the time $t_4$ when the counted value of the second counter 16 reaches firstly the complementary output of the latch circuit 14.

The wheel speed signal V approaches the approximate vehicle speed E with the maintenance of the brake pressure P. At time $t_{10}$, the acceleration signal +b ends, namely becomes lower as "0". The solenoid portion 25 of the inlet valve 32 is deenergized to rise the brake pressure P.

Hereafter, the above-described operations are repeated to control the brake pressure P to the wheel in the optimum condition.

In the above embodiment, the time interval extending from the time when the deceleration of the wheel reaches the threshold deceleration —go after exceeding the maximum, to the time when the acceleration of the wheel reaches the threshold acceleration +go, is measured to set the time for rapidly increasing the brake pressure P. However, the time interval extending from the time when the output $\dot{V}$ of the differentiator 5 becomes minimum or reaches a level other than the threshold deceleration —go, to the time when the output $\dot{V}$ of the differentiator 5 reaches the threshold acceleration +go, may be measured to set the time for rapidly increasing the brake pressure P. Or the output of the differentiator 5 may be differentiated during the time when the deceleration of the wheel decreases, to set the time for rapidly increasing the brake pressure P.

According to this invention, as above described, the excessive lowering of the brake pressure due to the amplification and time lag of the wheel speed which are caused by the relative rotation of the stationary part of the wheel speed sensor 1 to the rotational part thereof on braking the vehicle, is compensated by the rapid increase of the brake pressure during the time when the acceleration signal +b is generated. Thus, the skid control operation is optimized.

Moreover, according to this invention, the excessive lowering of the brake pressure due to hysteresis phenomena of the brake cylinder which is caused by friction between the cylinder and the piston, is compensated by the above-described rapid increase of the brake pressure.

While the preferred embodiment has been described, variations thereto will occur to those skilled in the art within the scope of the present invention concepts which are delineated by the following claims.

What is claimed is:

1. A skid control system for a vehicle having at least one wheel and a brake for the wheel comprising:
    (a) wheel speed detecting means for providing an output signal representative of the rotational speed of said wheel with respect to the vehicle;
    (b) differentiating means for differentiating said output signal of the wheel speed detecting means and providing an output signal representative of acceleration or deceleration of said wheel;
    (c) a deceleration signal generator connected to said differentiating means, said deceleration signal generator generating a deceleration signal when the output signal of said differentiating means exceeds predetermined threshold deceleration;

(d) an acceleration signal generator connected to said differentiating means, said acceleration signal generator generating an acceleration signal when the output signal of said differentiating means exceeds a predetermined threshold acceleration;

(e) brake relieving means for decreasing the brake pressure to the brake for said wheel in response to the deceleration signal of said deceleration signal generator;

(f) first brake control means for maintaining the brake pressure to the brake for said wheel constant, or gradually increasing the brake pressure to the brake for said wheel, in response to the acceleration signal of said acceleration signal generator; and (g) second brake control means for rapidly increasing the brake pressure to the brake for said wheel for a predetermined time in accordance with the slope of the output signal of said differentiating means within the time when said acceleration signal generator generates the acceleration signal.

2. A skid control system according to claim 1, in which said second brake control means includes time set means for setting said predetermined time.

3. A skid control system according to claim 2, in which said time set means is controlled on the basis of the deceleration and acceleration signals of said deceleration and acceleration signal generators.

4. A skid control system according to claim 3, in which said time set means includes a clock pulse generator, and first counter means for counting clock pulses from said clock pulse generator.

5. A skid control system according to claim 4, in which said first counter means starts to count the clock pulses from said clock pulse generator at the end of said deceleration signal and ends to count the clock pulses from said clock pulse generator at the beginning of said acceleration signal, and said predetermined time is determined by the counted value of said first counting means.

6. A skid control system according to claim 5, in which said time set means includes a flip flop, and the end of said deceleration signal and the beginning of said acceleration signal are detected by said flip flop.

7. A skid control system according to claim 6, in which the beginning of said predetermined time corresponds to the beginning of said acceleration signal.

8. A skid control system according to claim 7, in which said time set means includes second counter means for counting the clock pulses from said clock pulses generater, and comparating means, said second counter means starts to count the clock pulses from said pulse generator at the beginning of said acceleration signal and ends to count the clock pulses from said pulse generator at the time when said comparating means detects that the counted value of said second counter means reaches the complement to the counted value of said first counter means.

9. A skid control system according to claim 8, in which said predetermined time corresponds to the counted value of said second counter means at the time when said comparating means detects that the counted value of said second counter means reaches the complement to the counted value of said first counter means.

10. A skid control system according to claim 9, in which said time set means includes a second flip flop, and the detecting output of said comparating means is supplied to a set terminal of said second flip flop to determine the end of said predetermined time.

11. A skid control system according to claim 5, in which said first brake control means includes a rectangular pulse generator to gradually increase the brake pressure to the brake for said wheel.

* * * * *